US011962981B2

(12) United States Patent
Holstrom et al.

(10) Patent No.: US 11,962,981 B2
(45) Date of Patent: Apr. 16, 2024

(54) MULTI-VOICE CONFERENCING DEVICE SOUNDBAR TEST SYSTEM AND METHOD

(71) Applicant: Crestron Electronics, Inc., Rockleigh, NJ (US)

(72) Inventors: Robert Holstrom, Park Ridge, NJ (US); Alexander Marra, Ridgewood, NJ (US); Mark LaBosco, New City, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 17/475,904

(22) Filed: Sep. 15, 2021

(65) Prior Publication Data

US 2022/0086579 A1 Mar. 17, 2022

Related U.S. Application Data

(60) Provisional application No. 63/078,933, filed on Sep. 16, 2020.

(51) Int. Cl.

| | |
|---|---|
| ***H04R 29/00*** | (2006.01) |
| ***H04R 3/00*** | (2006.01) |
| ***H04S 7/00*** | (2006.01) |

(52) U.S. Cl.

CPC ............ *H04R 29/001* (2013.01); *H04R 3/00* (2013.01); *H04S 7/301* (2013.01)

(58) Field of Classification Search

CPC .... H04R 29/00; H04R 29/001; H04R 29/004; H04R 3/00; H04R 29/007; H04S 7/301; H04S 7/308; H04S 7/305

USPC .................... 381/58–59, 103–104, 107, 303

See application file for complete search history.

(56) References Cited

U.S. PATENT DOCUMENTS

| | | | | |
|---|---|---|---|---|
| 6,035,046 | A | 3/2000 | Cheng et al. | |
| 7,496,205 | B2 * | 2/2009 | Kuhnel | H04R 25/70 381/60 |
| 8,320,824 | B2 * | 11/2012 | Banks | H04R 5/02 455/3.06 |
| 9,516,444 | B2 * | 12/2016 | Riggi | H04W 4/80 |

(Continued)

OTHER PUBLICATIONS https://docs.microsoft.com/en-us/skypeforbusiness/certification/test-spec.

*Primary Examiner* — Disler Paul

(74) *Attorney, Agent, or Firm* — Crestron Electronics, Inc.

(57) ABSTRACT

A system is provided herein comprising: a host audio testing device (HATD) adapted to generate one or more uniquely addressed audio test signals and transmit each generated audio test signal, and which is further adapted to receive audio test data from a bi-directional audio transceiver device (soundbar) device under test (DUT) that can be used in two or more remotely located conference rooms to perform teleconferencing between the remotely located conference rooms; and one or more remote audio generating devices (RATD), each of which is adapted to receive a generated uniquely addressed one or more audio test signals and broadcast the same to the soundbar, wherein each of the RATDs can be located at the same or different distances from the soundbar, the same or different heights with respect to the soundbar, and at the same or different angular placements with respect to the soundbar, and wherein, the HATD is further adapted to store and process the received audio test data from the DUT and generate audio test data reports.

33 Claims, 7 Drawing Sheets

(56) References Cited

U.S. PATENT DOCUMENTS

| | | | | |
|---|---|---|---|---|
| 10,127,921 | B2 * | 11/2018 | Iyer | H04R 3/02 |
| 10,720,144 | B2 * | 7/2020 | Darlington | H04R 5/033 |
| 10,879,964 | B2 * | 12/2020 | Yiu | H04B 7/0617 |
| 10,887,713 | B1 * | 1/2021 | Asfaw | H04R 25/305 |
| 11,190,890 | B2 * | 11/2021 | Khenkin | H04R 19/04 |
| 11,579,846 | B2 * | 2/2023 | Binal | G08C 23/04 |
| 11,711,650 | B2 * | 7/2023 | Malpani | G06F 3/165<br>381/58 |
| 11,832,067 | B2 * | 11/2023 | Klinke | H04R 29/005 |
| 2021/0099736 | A1 * | 4/2021 | Soto | H04N 21/43615 |

* cited by examiner 600 (202, 204, 208)

MULTI-VOICE CONFERENCING DEVICE SOUNDBAR TEST SYSTEM AND METHOD

PRIORITY INFORMATION

The present application claims priority under 35 U.S.C. § 119(e) to U.S. Provisional Patent Application Serial No. 63/078,933, filed Sep. 16, 2020, the entire contents of which are expressly incorporated herein by reference.

BACKGROUND OF THE INVENTION

Technical Field

The embodiments described herein relate generally to test systems, and more specifically to systems, methods, and modes for automated testing of a bi-directional audio communication system for use with teleconferencing systems.

Background Art

Typical testing of conference room audio/video systems is performed using one voice source on each side of the audio/video interface at two or more specific locations. Once a first test is complete, the location of the test equipment is changed, and the test performed again. This type of testing takes a lot of time moving equipment around and retesting. Analysis of the data on each test needs to be synchronized—which is also a time-consuming task, even if performed using software.

Accordingly, a need has arisen for systems, methods, and modes for automated testing of a bi-directional audio communication system for use with teleconferencing systems.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for automated testing of a bi-directional audio communication system for use with teleconferencing systems that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a system is provided, comprising: a host audio testing device (HATD) adapted to generate one or more uniquely addressed audio test signals and transmit each generated audio test signal, and which is further adapted to receive audio test data from a bi-directional audio transceiver device (soundbar) device under test (DUT) that can be used in two or more remotely located conference rooms to perform teleconferencing between the remotely located conference rooms; and one or more remote audio generating devices (RATD), each of which is adapted to receive a generated uniquely addressed one or more audio test signals and broadcast the same to the soundbar, wherein each of the RATDs can be located at the same or different distances from the soundbar, the same or different heights with respect to the soundbar, and at the same or different angular placements with respect to the soundbar, and wherein, the HATD is further adapted to store and process the received audio test data from the DUT and generate audio test data reports.

According to a second aspect of the embodiments, a method is provided for testing a bi-directional audio transceiver device (soundbar) device under test (DUT), the method comprising: setting up the DUT in a test room; calibrating one or more loudspeakers and one or more microphones that are part of one or more remote audio test devices (RATDs); selecting an audio signal test track on a host audio test device (HATD), wherein the audio signal test track comprises one or more audio test signals; transmitting the audio signal test track to the one or more remote audio test devices (RATDs) from the host audio test device (HATD); broadcasting the audio test signal by the RATD to the DUT as an acoustic audio test signal; and receiving audio test signal data from the DUT by the HATD, and recording the same.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

Figure 1:
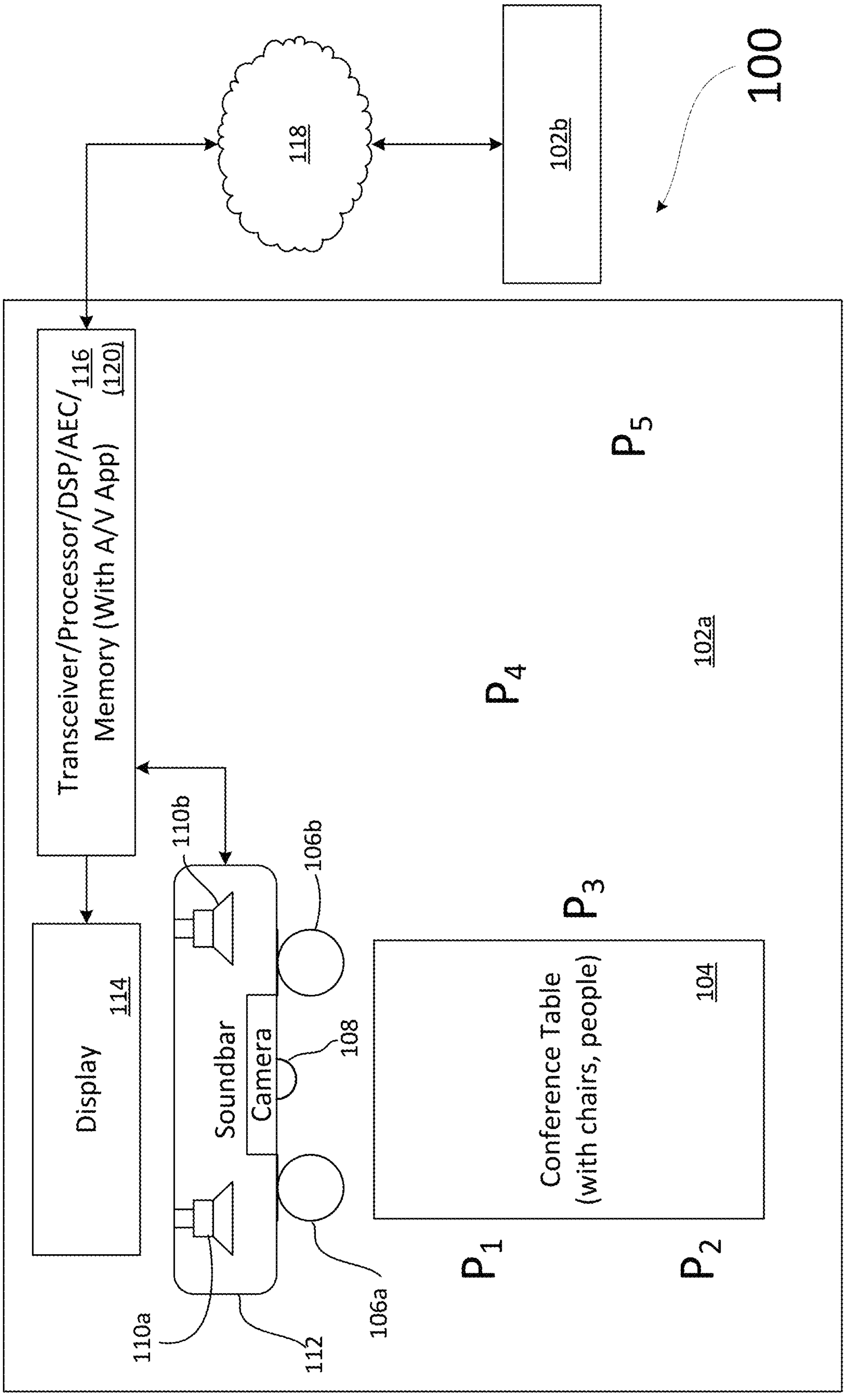
FIG. 1 illustrates a teleconferencing system that includes a bi-directional audio/video communication system.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as test system, and more particularly to automated test systems of a bi-directional audio communication system for use with teleconferencing systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of a systems, methods, and modes for automated testing of a bi-directional audio communication system for use with teleconferencing systems but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as an automated test system, can be used to test a bi-directional audio communication system for use with teleconferencing systems that can be manufactured by Crestron Electronics Inc., located in Rockleigh, N.J., and which has been marketed and sold under the registered trademark name of "UC Smart Soundbar." As those of skill in the art can appreciate, a soundbar is one example of a bi-directional audio communication conferencing device that incorporates one or more loudspeakers and one or more microphones, among other types of circuitry, in order to facilitate communications between parties that are located remotely from each other. According to further aspects of the embodiments, other examples of bi-directional audio communication conferencing devices include tabletop conferencing devices (e.g., Crestron's Mercury system (part number CCS-UC1), and ceiling mounted microphone/speaker systems.

LIST OF REFERENCE NUMBERS FOR THE ELEMENTS IN THE DRAWINGS IN NUMERICAL ORDER

The following is a list of the major elements in the drawings in numerical order.

100 Teleconferencing System
102 Conference Room
104 Table/Chairs
106 Microphone (Mic)
108 Camera
110 Loudspeaker
112 Soundbar
114 Video Display
116 Audio Video Processing Device
118 Network (Internet)
120 Audio Video Application (AV App)
200 Automated Test System (ATS)
202 Remote Audio Test Device (RATD)
204 Host Audio Test Device (HATD)
206 Audio Test Software Application (Audio Test App)
208 Personal Computer/Server (Server)
210 Wireless Transceiver
212 Wired Transceiver
214 Transmitted Test Audio Signal
216 Broadcast Acoustic Test Audio Signal
218 Received Electrical Test Audio Signal
220 Received Test Data Audio Signal
222 Soundbar Device Under Test (DUT)
302 RATD Processor Board
400 Method for Testing Soundbar
402-412 Steps of Method 400
600 Personal Computer/Laptop/Tablet/Personal Electronic Device (PED)/Server (Processing Device)
601 Shell/Box
602 Integrated Display/Touch-Screen (laptop/tablet etc.)
604 Internal Data/Command Bus (Bus)
606 Processor Internal Memory
608 Processor(s)
610 Universal Serial Bus (USB) Port
611 Ethernet Port
612 Compact Disk (CD)/Digital Video Disk (DVD) Read/Write (RW) (CD/DVD/RW) Drive
614 Floppy Diskette Drive
616 Hard Disk Drive (HDD)
618 Read-Only Memory (ROM)
620 Random Access Memory (RAM)
622 Video Graphics Array (VGA) Port or High Definition Multimedia Interface (HDMI)
624 External Memory Storage Device
626 External Display/Touch-Screen
628 Keyboard
630 Mouse
632 Processor Board/PC Internal Memory (Internal Memory)
634 Flash Drive Memory
636 CD/DVD Diskettes
638 Floppy Diskettes
640 Executable Software Programming Code/Application (Application, or "App")
642 Wi-Fi Transceiver
644 BlueTooth (BT) Transceiver

646 6ear Field Communications (NFC) Transceiver
648 Third Generation (3G), Fourth Generation (4G), Long Term Evolution (LTE), Fifth Generation (3G/4G/LTE/5G) Transceiver
650 Communications Satellite/Global Positioning System (Satellite) Transceiver Device
652 Antenna
654 Internet
656 Universal Serial Bus (USB) Cable
658 Ethernet Cable (CAT5)
660 Scanner/Printer/Fax Machine
700 Network System
702 Mobile Device
704 Personal Computer (PC)
706 Internet Service Provider (ISP)
708 Modulator/Demodulator (Modem)
710 Wireless Router
712 Plain Old Telephone Service (POTS) Provider
714 Cellular Service Provider
718 Communications Satellite
720 Cellular Tower
724 GPS Station
726 Satellite Communication Systems Control Stations
728 Global Positioning System (GPS) Satellite List of Acronyms Used in the Specification in Alphabetical Order The following is a list of the acronyms used in the specification in alphabetical order.

3G Third Generation
4G Fourth Generation
5G Fifth Generation
API Application Programming Interface
App Executable Software Programming Code/Application
ASIC Application Specific Integrated Circuit
ATS Automated Test System
ATT Audio Test Track
AV Audio Video
BIOS Basic Input/Output System
BT Bluetooth
CD Compact Disk
CRT Cathode Ray Tube
DVD Digital Video Disk
EEPROM Electrically Erasable Programmable Read Only Memory
FPGA Field Programmable Gate Array
GAN Global Area Network
GPS Global Positioning System
GUI Graphical User Interface
HATD Host Audio Test Device
HDD Hard Disk Drive
HDMI High Definition Multimedia Interface
ISP Internet Service Provider
LCD Liquid Crystal Display
LED Light Emitting Diode Display
LTE Long Term Evolution
Mic Microphone
MODEM Modulator-Demodulator
NFC Near Field Communications
NFC Near Field Communication
PC Personal Computer
PED Personal Electronic Device
POTS Plain Old Telephone Service
PROM Programmable Read Only Memory
RAM Random Access Memory
RATD Remote Audio Test Device
ROM Read-Only Memory
RW Read/Write
SST Speech Signal Transceiver
USB Universal Serial Bus (USB) Port
UV Ultraviolet Light
UVPROM Ultraviolet Light Erasable Programmable Read Only Memory
VGA Video Graphics Array FIG. 1 illustrates teleconferencing system 100 that includes a bi-directional audio/video communication system that comprises near-end conference room 102*a,* conference room table/chairs 104, soundbar 112 (which comprises mics 106*a,b,* camera 108, and loudspeakers 110*a,b*), display 114, and audio-video (AV) processing device (AV device) 116, which can include one or more of a processor, an ethernet transceiver, one or more of a wired and wireless transceiver, digital signal processor (DSP), acoustic echo cancellation (AEC) circuitry, among other types of circuitry, and which is used to control/monitor and interface with soundbar 112 and display 114. AV device 116 can be a standalone device connected to soundbar 112 and/or display 114, or it can be located within soundbar 112 or display 114. AV processing device 116 communicates, typically using Ethernet CAT5 type cable through Internet/network 118, to a far-end conference room 102*b* (or a plurality of far-end conference rooms), each of which contains substantially similar types of equipment therein. AV processing device 116 uses AV application (AV App) 120 to process audio and video information, conduct communications, and in general operate all of the equipment related to soundbar 112, display 114, and equipment in other locations (e.g., conference room 102*b*). A detailed discussion of teleconferencing system 100 and its components is both not needed to understand the aspects of the embodiments and beyond the scope of this discussion, and therefore, in fulfillment of the dual purposes of clarity and brevity, such a detailed discussion has been omitted from herein. Also shown as being located in conference 100 are people $P_1$-$P_5$, located at different distances and angles in regard to soundbar 112.

Figure 2:
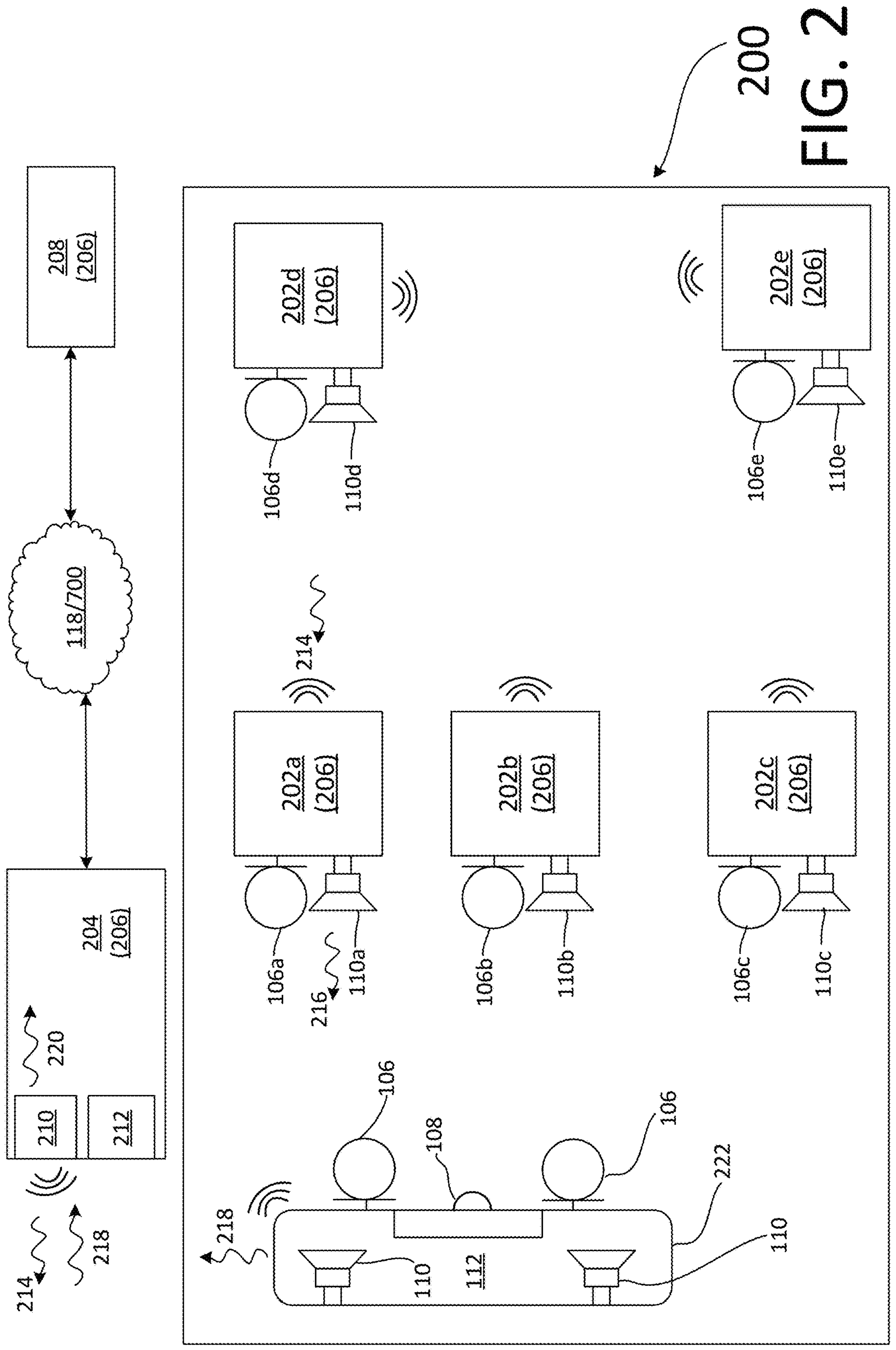
FIG. 2 illustrates an automated test system of a bi-directional audio communication system for use with teleconferencing systems according to aspects of the embodiments.

FIG. 2 illustrates automated test system (ATS) 200 that can be used to test soundbar 112 for use with teleconferencing system 100 according to aspects of the embodiments. ATS 200 comprises at least one soundbar 112 (or device under test (DUT) 222), host audio test device (HATD) 204, and remote audio test devices (RATD) 202, among other components, described below.

HATD 204 comprises at least one processor board, with at least one microprocessor and associated memory devices, any of which can store audio test software application (audio test App) 206 according to aspects of the embodiments. HATD 204 further comprises at least one of a wireless transceiver 210 and wired transceiver 212.

A plurality of RATDs 202 is shown in FIG. 2. Each RATD 202 comprises at least one processor board, with at least one microprocessor and associated memory devices, any of which can store audio test software application (audio test App) 206 according to aspects of the embodiments. RATD 202 further comprises at least one of a wireless transceiver 210 and wired transceiver 212. Transceivers 210, 212 can be used to communicate between RATD 202 and HATD 206 according to aspects of the embodiments, as well as with a local or remotely located personal computer/server (server) 208 through network 118/700, wherein network 118 can be a local area network (LAN), wide area network (WAN), a global area network (GAN), or the Internet, and network system 700 can include the Internet as well as other communication networks, as described below in greater detail in regard to FIG. 7. Either or both of server 208 and HATD 204 can further include monitors, displays, interfaces such as keyboards, mouses, and the like, all of which have not been shown and/or described in fulfillment of the dual purposes of clarity and brevity. For purposes of this discussion, and not to be taken in a limiting manner, communications between each of RATD 202*a-e* and HATD 206 shall be presumed to occur wirelessly via wireless transceiver 210.

Figure 3:
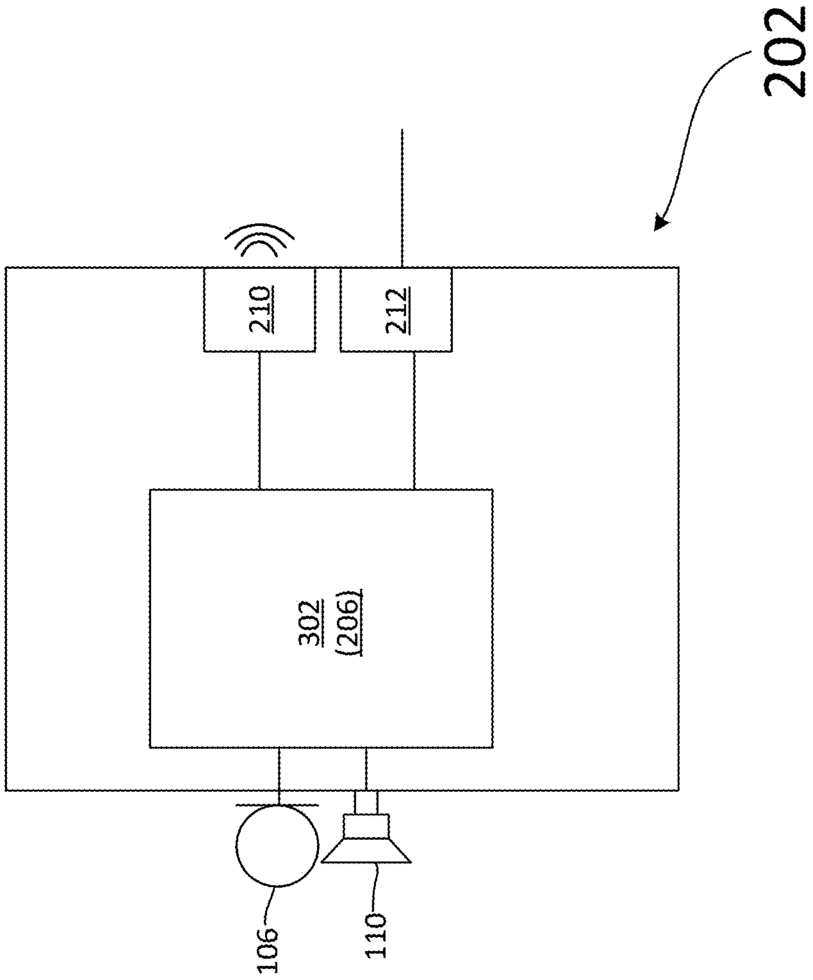
FIG. 3 illustrates a block diagram of a remote audio test device used in the automated test system as shown in FIG. 2 according to aspects of the embodiments.

HATD 204 can be a unique stand alone device, specifically designed for the task of automated testing of soundbars 112, or it can be a personal computer/server with the appropriates interfaces (e.g., wireless, and wired transceivers 210, 212, respectively). RATD 202, as shown in FIG. 3, includes at least one mic 106, at least one loudspeaker 110, an RATD processor board 302 (which can include one or more processors, memory devices for storing audio test software application (audio test App) 204), and other circuitry, and at least one of wireless transceiver 210 and wired transceiver 212, according to aspects of the embodiments. According to further aspects of the embodiments, all of the components of HATD 204 can be located as part of a first RATD 202, such that there is no separate HATD 204.

As can be appreciated by those of skill in the art, Test App 206 is typically software stored in the memory associated/part of the processor(s) that are part of HATD 204 and RATD 202, and provides a means to test soundbar 112 device under test (DUT) 222 by generating and transmitting sound signals to one or more of loudspeakers 110 that are part of RATDs 202*a-e* according to aspects of the embodiments. Test App 206 also interfaces with the soundbar 112 device under test (DUT) 222 to acquire audio test data, which is typically digitized, though does not necessarily need to be, and for storing and processing the same. Both acquired pre-processed and processed data can be transmitted via network 118 to server 208 for further processing and/or storage according to aspects of the embodiments.

According to aspects of the embodiments, Test App 206 can be used to provide audio testing that replicates one or more voices to DUT 222 (discussed in greater detail below). Such audio testing of DUT 222 by one or more simulated voices can provide both objective and subjective data that can be used to score, rank, or benchmark a soundbar 112 and the test results can be compared new versions of soundbar 112, when design changes are implemented and/or to compare against other similar systems (such as those manufactured/sold by a competitor).

ATS 200 includes one or more RATDs 202, and these can be located at different positions for angular and distance testing to simulate real-world applications of teleconferencing system 100 with multiple simulated people. As those of skill in the art can appreciate, the number of RATDs 202 shown in FIG. 2 is but an example, and is not meant to be, nor should be taken in a limiting manner According to an aspect of the embodiments, a first test pattern can comprise substantially consistent stimuli provided to each RATD 202, wherein the acoustic signal output from each loudspeaker 110*a-e* represents a simulated voice. That is, a test signal can be generated that comprises one or more electrical audio signal created to simulate a voice, with defined frequency and amplitude variations. The electrical audio signal, which can be analog, but is more commonly digital, can be substantially identical for each RATD 202, or they can all be different, or they can be the same for a first subset of RATDs 202, and so on.

Figure 5:
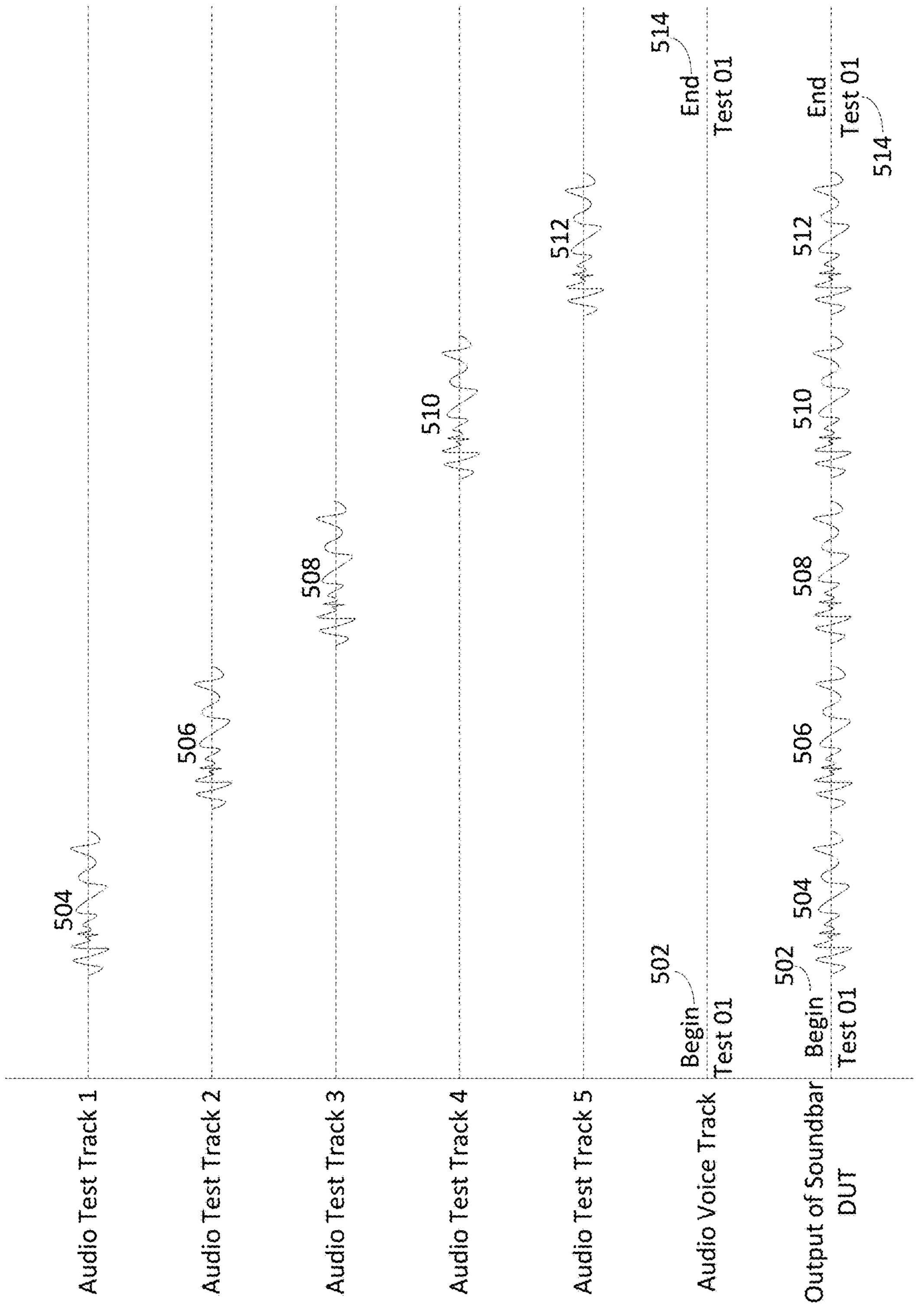
FIG. 5 illustrates a series of audio signals generated by the automated test system as shown in FIGS. 2 and 3 to test a bi-directional audio/video communication system, and a recording of the audio signals as received by the bi-directional audio communication system device under test according to aspect of the embodiments.

The timing and level of the acoustic signal output from each loudspeaker 110*a-e* (i.e., simulated voice) can be made substantially consistent to each loudspeaker 110*a-e* by a multi-channel audio script created and played back via one or more multi-channel audio sources, embodied within Test App 206 according to aspects of the embodiments. One example of a test audio strip is shown in FIG. 5, discussed in detail below.

Referring again to FIG. 2, transmitted test audio signal 214 is transmitted by HATD 204 to one or more of RATDs 202. HATD 204 can transmit test audio signal 214 to a particular RATD 202, or to all or some of the RATDs 202 in ATS 200 according to aspects of the embodiments. Transmitted test audio signal 214 is received by one or more RATDs 202 and broadcast as broadcast acoustic test audio signal 216 from its respective loudspeaker 110. Broadcast acoustic test signal 216 is received by soundbar 112 by one or more of mics 106, and is converted into received electrical test audio signal 218 (which can be an analog signal, but is most typically a digital signal). DUT 222 then transmits received electrical test audio signal 218 (via wireless or wired transceiver 210, 212) to HATD 204, which then processes it as received test data audio signal 220. Received test data audio signal 220 can be processed within HATD 204 using audio test App 206 stored in memory therein, or can be processed at server 208 using audio test App 206.

Prior to testing, however, each test audio signal 214 and its corresponding loudspeaker 110*a-e* can be calibrated to a Tele-Conference level standard. The Tele-Conference level standard is a specific sound pressure level that a human voice typically has. According to further aspects of the embodiments, the Tele-Conference level standard can also include compliance frequency testing; in that case, each simulated voice and corresponding loudspeaker is calibrated for frequency. According to further aspects of the embodiments, the method, modes, and systems described herein provide comparison testing of soundbar products against each other and use such data as audible and graphs to compare the soundbar products.

According to aspects of the embodiments, a separate audio channel or track of the multi-channel test recording can be sent to a far end DUT 222 (e.g., soundbar 112), simulating a person on the other side of the bi-directional audio communication system (and which can be referred to as a "far end voice simulation audio signal"). This allows far-end and double-talk testing to be performed during the same test. That is, according to one aspect of the embodiments, the far end voice simulation audio signal can literally be transmitted to a remotely located soundbar 112 and RATDs 202, broadcast by the RATD 202, and the audio picked up by a mic 106 on the soundbar 112 DUT 222 and returned to the first DUT 222 and RATD 202 located at the near end. Or, according to a further aspect of the embodiments, the transmission to and receipt back from the far end DUT 222/soundbar 112 can be simulated with software with delays and phase shifts added to the received far end voice simulation audio signal.

A noise track can also be used to simulate background noise. In ATS 200, one or more loudspeakers 110 can be designated for the noise signals, although this need not necessarily be the case. That is, any of the loudspeakers 110*a-e* can also receive and output a noise signal, and the noise signal can be the same for each loudspeakers 110*a-e*, or each loudspeaker can get a different noise signal, or any variation thereof. As with any test signal, the noise test signals can be output from each RATD 202*a-e* substantially simultaneously, or sequentially, or in sub-groups, or all at once, and the noise test signals can be the same or different for any variation of how they are transmitted and broadcast from each RATD 202.

According to further aspect of the embodiments, transmitted test audio signal 212 can be a single or multi-tone signal to test specific frequency responses of the soundbar 112 DUT; that is, instead of a simulated voice signal, or noise signal, transmitted test audio signal 214 can be a signal composes of a single frequency, or multiple frequencies, or it can be a swept frequency signal (i.e., beginning at 20 Hz to 20 kHz), and so on. A particular audio test (not to be taken in a limiting manner, as innumerable testing patterns can be generated) is described below in regard to FIG. 5.

During audio testing, DUT 222 receives audio output as acoustic waves from one or more of loudspeakers 110*a-e* of RATD 202*a-e* at one or more mics 106. After receiving the audio at mics 106, it can be either transmitted to HATD 204 and Test App 206 as an analog signal, but typically can be converted into a digital signal (received test data audio signal). When the received test data audio signal from DUT 222 is received by HATD 204 (i.e., the digital received test data audio signal), it is recorded along with the test signal that was output to the one or more loudspeakers 110*a-e,* according to aspects of the embodiments. In this manner, comparative listening of the test signal output to loudspeakers 110*a-e* and the received test data audio signal can be made; according to further aspects of the embodiments, the audio signals can both be digitized and compared for signal level, spectral response, phase shift, and the like in order to obtain a clearer understanding of how well the DUT 222 is performing in a simulated operating environment. Such recordings can be referred to as 2-channel recordings. The 2-channel recording can be stored and used for future analysis and comparative listening. The test results from multiple tests can be synchronized for analysis purposes to compare design changes or to compare different systems.

The following table is a list of one example of automated test stimuli, or a list of the different audio tracks and where they are directed to in ATS 200 according to aspects of the embodiments. Note that in this case, there are four voice audio tracks (loudspeakers 110-*a-d*), one noise track (loudspeaker 110*e*), and a voice prompt that announces the upcoming test that can be transmitted to the loudspeakers 110 located on DUT 222.

| Track Number | Destination of Output Track |
|---|---|
| 1 | Loudspeaker 1 |
| 2 | Loudspeaker 2 |
| 3 | Loudspeaker 3 |
| 4 | Loudspeaker 4 |
| 5 | Background Noise Loudspeaker 5 |
| 6 | Voice prompt announcing which loudspeaker is presently being tested |

According to aspects of the embodiments, the audio tracks to the loudspeakers on the RATDs 202*a-e* consist of calibrated levels to test for audio levels at different distances and angles from DUT 222. According to further aspects of the embodiments, there are innumerable testing scenarios. Those of skill in the art can appreciate that near side audio refers to audio generated in the same conference room 102*a* that DUT 222 is located in, and far side audio is that audio generated, or replicated as being generated, from a distant conference room 102*b* and soundbar 112*b* such that soundbar 112*a* is in communication with soundbar 112*b*.

According to further aspects of the embodiments, and not to be taken in a limiting manner, testing of DUT 222 can include outputting audio test signals to multiple loudspeakers at the same time, generating audio meant to replicate audio transmitted from a far side conference room 102*b* (i.e., audio generated from a different physical location and output by the bi-directional audio communication device (e.g., soundbar 112 or DUT 208)), and far side audio with near side audio to test echo cancellation, among other types of testing. Any and all of the above-mentioned audio testing can be performed with or without simulated background noise. Different levels and spectrums of noise can be used, with different audio levels of differing spectrums as well. The number and placement of loudspeakers shown in FIG. 2 is not to be taken as limiting as there are substantially innumerable combinations of the number and placement of loudspeakers according to aspects of the embodiments. In addition, different heights of the loudspeakers, simulating people sitting and standing, can be used to test DUT 222. According to further aspects of the embodiments, there can be one or a plurality of mics 106 on DUT 222, and DUT 222 can be programmed to receive audio on one or different combinations of mics 106 in order to test acoustic echo cancellation (AEC), beamforming, and the like. Audio can be output from loudspeakers 110*a-e* to replicate a person moving from one side to the other of room 102, or from front to back, or virtually any direction and at different elevations to determine the efficacy of beamforming and AEC and the like. The volumes of the audio can be modulated to test different functions of audio transfer and filtering functions, such as ducking, and the like. All of the recorded audio data from received test data audio signal can be analyzed using time-based audio visualization to verify dropouts, echoing, and level changes. In addition, listening tests can also be performed to comparing different systems and modifications to system settings, acoustics, hardware, and firmware.

According to further aspects of the embodiments, the system and method(s) described herein in regard to testing of soundbar 112 as DUT 222 can provide not only measurements of DUT 222 as receiving audio signals, but also in producing audio signals that are broadcast from one or more loudspeakers 110 located on DUT 222 and received by mics 110*a-e* of RATDs 202*a-e*. Thus, according to further aspects of the embodiments, the system and method(s) described herein in regard to testing of soundbar 112 as DUT 222 can provide not only objective test measurements, but subjective test measurements as well, i.e., how "good" does soundbar 111/DUT 222 sound? It is known by those of skill in the art that certain manufacturers provide equipment that can be used to make objective measurements such as those described herein. Such manufacturers include, among others, Head Acoustics Inc., Listen Inc., among others. Equipment manufactured by these, and other companies provide objective measurements that generate detailed test reports that can include "scores" of how DUT 222/soundbar 112 performs. Such objective tests can quantify the performance of voice quality, automatic gain control (AGC), single-talk and double talk AEC, and noise reduction, among other objective test measurements.

However, as those of skill in the art can appreciate, audio systems, especially those that include one or more speakers, and which project sound, can be and usually are defined by more that just "objective" test measurements. That is, it is sometimes the case, or more generally the situation, that subjective "measurements" can be just as important as objective measurements. That is, how a sound system actually "sounds" is or can be just as important to users as the objective measurements of Signal-to-Noise ratio (SNR), amplitude gain, AGC, AEC, and the like.

Thus, according to aspects of the embodiments, subjective users or test takers can listen for how natural voices sound, AGC breathing artifacts, and echo processing audibility. It is sometimes the case that noise reduction can make voices sound robotic or artificial.

According to aspects of the embodiments, AGC can be checked by looking at the near end signal sent when speakers at various distances produce voice tracks. Noise reduction ties into the noise track. According to further aspects of the embodiments, single talk echo can be tested by using a far end only track while monitoring the processed near end send signal. Ideally all echo is canceled.

According to aspects of the embodiments, double talk would involve far end and local speaker tracks producing sound simultaneously. Ideally near end is heard clearly while far end is canceled.

In addition to time based measurements there can be frequency-based or other processing methods that can be used for testing. These tests can be setup in different room types include rooms of various sizes and reverberation.

According to further aspects of the embodiments, a send signal automatic gain control (AGC) can be evaluated and tuned for level and time parameters so that voices played at various locations are sent to the far end at a relatively constant level without hearing artifacts of the gain changing. Further, noise reduction can be evaluated for effectiveness and artifacts since noise reduction often results in a processed or robotic sounding voices. According to aspects of the embodiments, beamforming parameters can be evaluated for de-reverberation, clarity, and time constants for adaption. As those of skill in the art can appreciate, people are generally sensitive to noise level changes that modulate with voices that are caused by AGC, beamforming and noise reduction. Through use of the systems and methods described herein, a frequency response of the microphone signal in the soundbar 112/DUT 222 can be evaluated using various voices at various locations. According to further aspects of the embodiments, tolerances in the beamforming parameters provide for leeway to tune this frequency response.

According to further aspects of the embodiments, multitrack recordings can be used to simulate a room full of people in a repeatable manner. Such multitrack recordings can be recordings of actual meeting playing both sides (near end and far end) of the conversation and includes the natural back and forth dialog of people in one or bother conference rooms 102. As those of skill in the art can appreciate, it can sometimes be the case that people on the far end can have a difficult time understanding the interaction if the audio is not clear or at a consistent level, and use of the systems and methods described herein according to aspects of the embodiments, can provide information that can be used to make adjustments (to beamforming, AGC, AEC, and the like) that can alleviate such audio reception difficulties.

According to further aspects of the embodiments, the multitrack audio recordings stored in HATD 204 can be used to simulate multiple people on both the near and the far side talking, such that "double talk" events can be evaluated. Further, background noise sources such as those simulating heating ventilation and air conditioning (HVAC) can then also be included on both the near and the far side. Thus, use of the systems and methods described herein according to aspects of the embodiments, can provide information that can be used to make adjustments (to beamforming, AGC, AEC, and the like) that can alleviate problems with double talk scenarios and background noise situations.

According to further aspects of the embodiments, one or more software applications (Apps) can be run on one or more computers (PCs) that can be interfaced with one or more networks, including but not limited to a local area network, a wide area network, and the like, as well as the Internet, and such networks can utilize one or more of landline communications systems, satellite communications systems, and/or wireless communications systems.

Test Data recorded between different tests can be synchronized to evaluate the results via test equipment and or listening tests.

Figure 4:
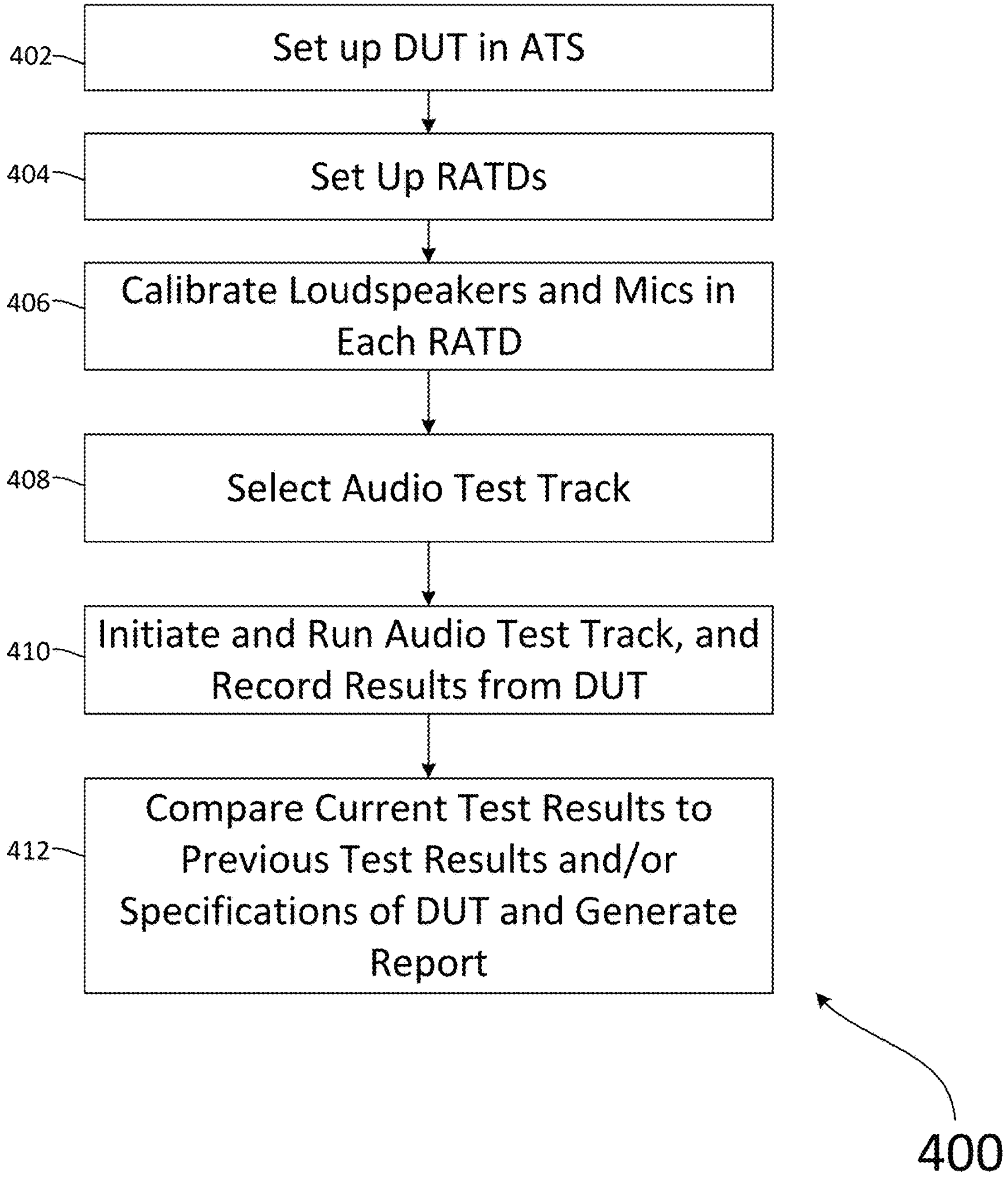
FIG. 4 is a flow chart of a method for using the automated test system as shown in FIGS. 2 and 3 to test a bi-directional audio/video communication system according to aspect of the embodiments.

FIG. 4 is a flow chart of method 400 for using the automated test system as shown in FIGS. 2 and 3 to test a bi-directional audio/video communication system according to aspect of the embodiments (method 400). As those of skill in the art can appreciate, method 400 can be implemented in software (AV App 206) that can be stored in memory associated with a processor that is part of HATD 204.

Method 400 begins with method step 402 in which DUT 222 is setup in ATS 200. In method step 404, one or more RATDs 204 are setup—i.e., located at known distances, angular placements, and heights from DUT 222. In method step 406, the loudspeakers 110*a-e,* and mics 106*a-e* in each RATD 202*a-e* are calibrated, as described above. Then, in method step 408, the user selects an audio test track. The audio test track is run in method step 410, and data collected and stored. In method step 412, results from the current audio test can be compared to previous audio tests and/or to specifications of the soundbar DUT 222.

FIG. 5 illustrates a series of audio signals generated by the automated test system 200 as shown in FIGS. 2 and 3 to test a bi-directional audio/video communication system (soundbar 112) and a recording of the audio signals as received by the bi-directional audio communication system device under test according to aspect of the embodiments.

In FIG. 5 there are shown five separate audio test tracks, Audio Test Track (ATT) 1-5, an Audio Voice Track, and an Output of Soundbar DUT. In each of the respective ATTs 1-5, an audio pattern is generated (504-512) in the manner described above, and played sequentially, in this case, through each of loudspeakers 110*a-e* in RATDs 202*a-e*. For example, ATT 1, signal 504, can be played through loudspeaker 110*a* in RATD 202*a,* ATT 2, signal 506, can be played through loudspeaker 110*b* in RATD 202*b,* and so on. According to further aspects of the embodiments, a voice prompt can be used, as shown in FIG. 5, informing users which test is going to be accomplished next so that when reviewing the test data, it is easy to correlate the data to a specific test. In this case, test signals 504-512 (five total) represent transmitted test audio signals 214*a-e*. Each signal is transmitted separately from the others, so that sound bar 112 DUT receives only one broadcast acoustic test audio signal 216 at a time, and therefor outputs the received signals in sequence, as the Output of Soundbar DUT indicates. Note also that there is an Audio Voice Track that announces the beginning of the test, and the end of the test, in this case "Begin Test 01," and "End Test 01." Such signal, of course, would need to be broadcast from some loudspeaker, and thus can be transmitted to any or all of loudspeakers 202*a-e,* or even the loudspeaker(s) 110 on DUT 222. The output of DUT 222 is received test data audio signal 220, and this data can be received, recorded, processed, and analyzed by audio test App 206 in HADT 204 and/or server 208 according to aspects of the embodiments.

Figure 6:
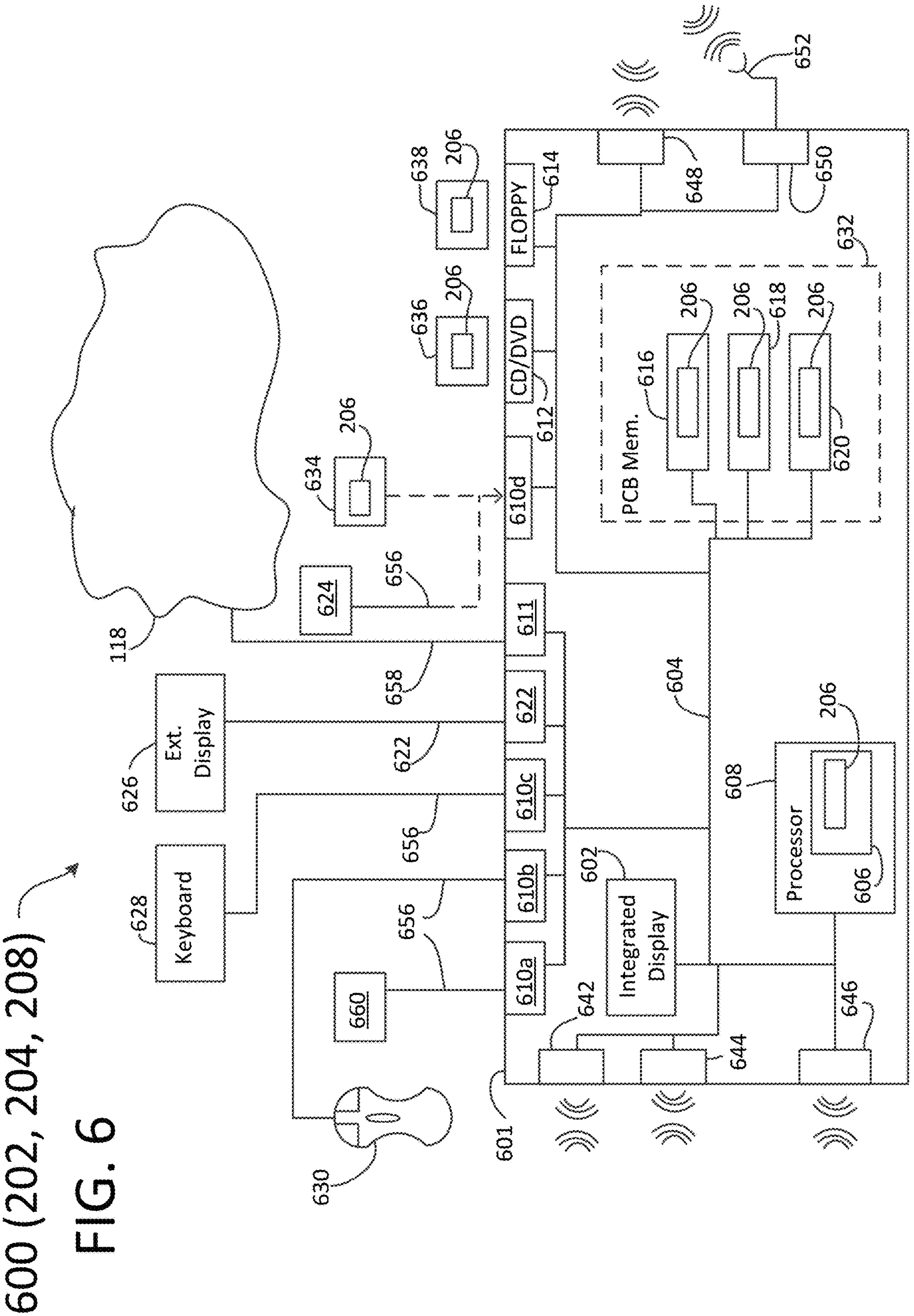
FIG. 6 illustrates a block diagram of a remote audio test device, host audio test device, and/or server, and which is suitable for use to implement the method shown in FIG. 4 for performing audio testing of a soundbar according to aspects of the embodiments.

FIG. 6 illustrates a block diagram of RATD 202, HATD 204, and/or server 208, and which shall from hereon in after referred to as "processing device" 600 suitable for use to implement method 400 for performing audio testing of soundbar 112 according to aspects of the embodiments. Processing device 600 comprises, among other items, shell/ box 601, integrated display/touch-screen 602 (though not used in every application of processor 124), internal data/command bus (bus) 604, processor board/processor internal memory (internal memory) 632, and one or more processors 608 with processor internal memory 606 (which can be typically read only memory (ROM) and/or random access memory (RAM)). Those of ordinary skill in the art can appreciate that in modern processor systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. Processing device 600 further comprises multiple input/output ports, such as universal serial bus ports 610, Ethernet ports 611, and video graphics array (VGA) ports/high definition multimedia interface (HDMI) ports 622, among other types. Further, Processing device 600 includes externally accessible drives such as compact disk (CD)/digital video disk (DVD) read/write (RW) (CD/DVD/RW) drive 612, and floppy diskette drive 614 (though less used currently, many PCs still include this device). Processing device 600 still further includes wireless communication apparatus, such as one or more of the following: Wi-Fi transceiver 642, BlueTooth (BT) transceiver 644, near field communications (NFC) transceiver 646, third generation (3G)/fourth Generation (4G)/long term evolution (LTE)/fifth Generation (3G/4G/LTE/5G) transceiver 648, communications satellite/global positioning system (satellite) transceiver device 650, and antenna 652.

Internal memory 632 itself can comprise hard disk drive (HDD) 616 (these can include conventional magnetic storage media, but, as is becoming increasingly more prevalent, can include flash drive memory 634, among other types), read-only memory (ROM) 618 (these can include electrically erasable (EE) programmable ROM (EEPROMs), ultra-violet erasable PROMs (UVPROMs), among other types), and random access memory (RAM) 620. Usable with USB port 611 is flash drive memory 634, and usable with CD/DVD/RW drive 612 are CD/DVD disks 636 (which can be both read and write-able). Usable with floppy diskette drive 614 are floppy diskettes 638. External memory storage 624 can be used to store data and programs external to box 601 of processing device 600, and can itself comprise another hard disk drive 616*a*, flash drive memory 634, among other types of memory storage. External memory storage 624 is connectable to processing device 600 via USB cable 656. Each of the memory storage devices, or the memory storage media (606, 616, 618, 620, 624, 634, 636, and 638, among others), can contain parts or components, or in its entirety, executable software programming code or application, e.g., audio test App 206, which can implement part or all of the portions of method 400 described herein.

In addition to the above described components, processing device 600 also comprises keyboard 628, external display 626, printer/scanner/fax machine 660, and mouse 630 (although not technically part of processing device 600, the peripheral components as shown in FIGS. 6 (622, 624, 626, 628, 630, 634, 636, 638, 656, 658, and 660) are so well known and adapted for use with processing device 600 that for purposes of this discussion they shall be considered as being part of processor 124). Other cable types that can be used with processing device 600 include RS 232, among others, not shown, that can be used for one or more of the connections between processing device 600 and the peripheral components described herein. Keyboard 628, mouse 630, and printer/scanner/fax machine 660 are connectable to processing device 600 via USB cable 56, and external display 626 is connectible to processing device 600 via VGA cable/HDMI cable 622. Processing device 600 is connectible to internet 654 via Ethernet port 66 and Ethernet cable 658 via a router and modulator-demodulator (MODEM), neither of which are shown in FIG. 6. All of the immediately aforementioned components (622, 624, 626, 628, 630, 634, 636, 638, 656, 658, and 660) are known to those of ordinary skill in the art, and this description includes all known and future variants of these types of devices.

External display 626 can be any type of known display or presentation screen, such as liquid crystal displays (LCDs), light emitting diode displays (LEDs), plasma displays, cathode ray tubes (CRTs), among others. In addition to the user interface mechanism such as mouse 630, processing device 600 can further include a microphone, touch pad, joystick, touch screen, voice-recognition system, among other interactive inter-communicative devices/programs, which can be used to enter data and voice, and which all of are known to those of skill in the art and thus a detailed discussion thereof has been omitted in fulfillment of the dual purposes of clarity and brevity.

As mentioned above, processing device 600 further comprises a plurality of wireless transceiver devices, such as Wi-Fi transceiver 642, BT transceiver 644, NFC transceiver 646, 3G/4G/LTE/5G transceiver 648, satellite transceiver device 650, and antenna 652. While each of Wi-Fi transceiver 642, BT transceiver 644, NFC transceiver 646, 3G/4G/LTE/5G transceiver 648, and satellite transceiver device 650 has their own specialized functions, each can also be used for other types of communications, such as accessing a cellular service provider (not shown), accessing internet 654, texting, emailing, among other types of communications and data/voice transfers/exchanges, as known to those of skill in the art. Each of Wi-Fi transceiver 642, BT transceiver 644, NFC transceiver 646, 3G/4G/LTE/5G transceiver 648, satellite transceiver device 650 includes a transmitting and receiving device, and a specialized antenna, although in some instances, one antenna can be shared by one or more of Wi-Fi transceiver 642, BT transceiver 644, NFC transceiver 646, 3G/4G/LTE/5G transceiver 648, and satellite transceiver device 650. Alternatively, one or more of Wi-Fi transceiver 642, BT transceiver 644, NFC transceiver 646, 3G/4G/LTE/5G transceiver 648, and satellite transceiver device 650 will have a specialized antenna, such as satellite transceiver device 650 to which is electrically connected at least one antenna 652.

In addition, processing device 600 can access network 122, either through a hard wired connection such as Ethernet port 66 as described above, or wirelessly via Wi-Fi transceiver 642, 3G/4G/LTE/5G transceiver 648 and/or satellite transceiver 650 (and their respective antennas) according to an embodiment. Processing device 600 can also be part of a larger network configuration as in a global area network (GAN) (e.g., the internet), which ultimately allows connection to various landlines.

According to further embodiments, integrated touch screen display 602, keyboard 628, mouse 630, and external display 626 (if in the form of a touch screen), can provide a means for a user to enter commands, data, digital, and analog information into processor 124. Integrated and external displays 602, 626 can be used to show visual representations of acquired data, and the status of applications that can be running, among other things.

Bus 604 provides a data/command pathway for items such as: the transfer and storage of data/commands between processor 608, Wi-Fi transceiver 642, BT transceiver 644, NFC transceiver 646, 3G/4G/LTE/5G transceiver 648, satellite transceiver device 650, integrated display 602, USB port 66, Ethernet port 66, VGA/HDMI port 622, CD/DVD/RW drive 612, floppy diskette drive 614, and internal memory 632. Through bus 604, data can be accessed that is stored in internal memory 632. Processing device 600 can send information for visual display to either or both of integrated and external displays 602, 626, and the user can send commands to system operating programs/software/Apps 206 that might reside in processor internal memory 606 of processor 608, or any of the other memory devices (636, 638, 616, 618, and 620).

Processing device 600, and either processor internal memory 606 or internal memory 632, can be used to implement method 400 for testing soundbar 112 according to aspects of the embodiments. Hardware, firmware, software, or a combination thereof may be used to perform the various steps and operations described herein. According to an embodiment, audio test App 206 for carrying out the above discussed steps can be stored and distributed on multi-media storage devices such as devices 616, 618, 620, 634, 636 and/or 638 (described above) or other form of media capable of portably storing information. Storage media 634, 636 and/or 638 can be inserted into, and read by devices such as USB port 66, CD/DVD/RW drive 612, and disk drives 614, respectively.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information, and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

Processing device 600 can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired, or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

According to further aspects of the embodiments, audio test App 206 embodies method 400, but also can operate soundbar 112, as well as facilitating storage of audio test data, generation of reports, communications, and the like.

Figure 7:
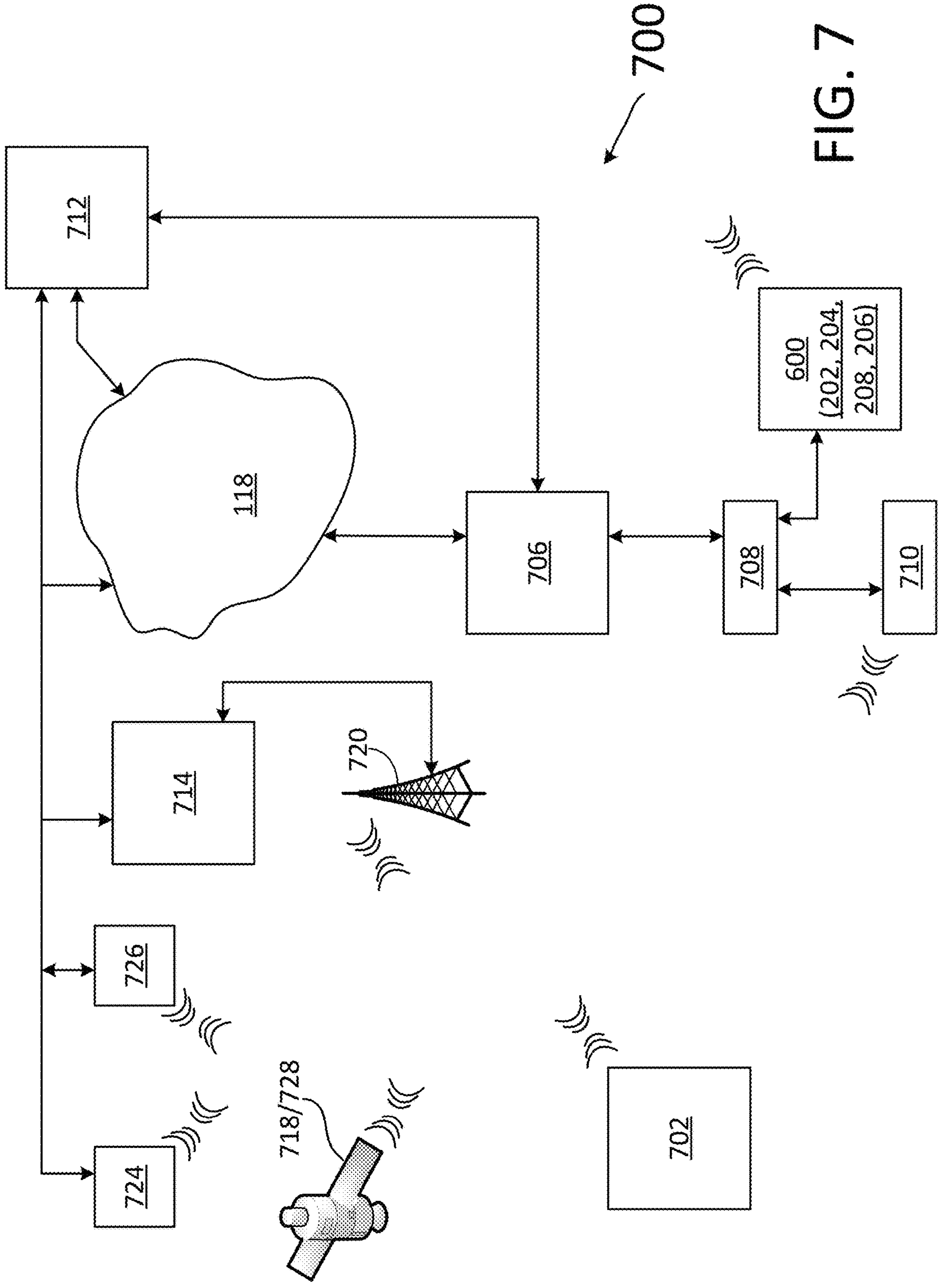
FIG. 7 illustrates a network system within which the system and method for testing a bi-directional audio/video communication system can be implemented according to aspects of the embodiments.

FIG. 7 illustrates network system 700 within which the system and method for testing soundbar 112 can be implemented according to aspects of the embodiments. Much of the network system infrastructure shown in FIG. 7 is or should be known to those of skill in the art, so, in fulfillment of the dual purposes of clarity and brevity, a detailed discussion thereof shall be omitted.

According to an embodiment, a user of the system and method for testing soundbar 112 could have audio test App 206 on RATD 202, HATD 204, server 208, as well as on their mobile device 702. Mobile devices 702 can include, but are not limited to, so-called smart phones, tablets, personal digital assistants, notebook, and laptop computers, and essentially any device that can access the internet and/or cellular phone service or can facilitate transfer of the same type of data in either a wired or wireless manner. For purposes of this discussion, however, the user shall be discussed as using RATD 202, HATD 204, server 208, and processing device 600. Those of skill in the art can appreciate that such discussion is to be taken in a non-limiting manner in view of the discussion above about the other types of devices that can access, use, and provide such information.

In FIG. 7, the user has mobile device 702, which can access cellular service provider 714, either through a wireless connection (cellular tower 720) or via a wireless/wired interconnection (a "Wi-Fi" system that comprises, e.g., modulator/demodulator (modem) 708, wireless router 710, personal computer (PC) 704, internet service provider (ISP) 706, and internet 722). Further, mobile device 702 and processing device 600 can include near field communication (NFC), "Wi-Fi," and Bluetooth (BT) communications capabilities as well, all of which are known to those of skill in the art. To that end, network system 700 further includes one or more processing devices 600 that can be connected to wireless router 710 via a wired connection (e.g., modem 708) or via a wireless connection (e.g., Bluetooth). Modem 708 can be connected to ISP 706 to provide internet based communications in the appropriate format to end users (e.g., PC 704), and which takes signals from the end users and forwards them to ISP 706. Such communication pathways are well known and understand by those of skill in the art, and a further detailed discussion thereof is therefore unnecessary.

Mobile device 702 and processing device 600 can also access global positioning system (GPS) satellite 728, which is controlled by GPS station 724, to obtain positioning information (which can be useful for different aspects of the embodiments), or mobile device 702 and processing device 600 can obtain positioning information via cellular service provider 714 using cell tower(s) 720 according to one or more well-known methods of position determination. Some mobile devices 702 can also access communication satellites 718 and their respective satellite communication systems control stations 726 (the satellite in FIG. 7 is shown common to both communications and GPS functions) for near-universal communications capabilities, albeit at a much higher cost than convention "terrestrial" cellular services. Mobile device 702 and processing device 600 can also obtain positioning information when near or internal to a building (or arena/stadium) through the use of one or more of NFC/BT devices, the details of which are known to those of skill in the art. FIG. 7 also illustrates other components of network system 700 such as plain old telephone service (POTS) provider 712.

According to further aspects of the embodiments, network system 700 also contains processing device 600, wherein one or more processors, using known and understood technology, such as memory, data and instruction buses, and other electronic devices, can store and implement code that can implement the system and method for testing soundbar 112 according to aspects of the embodiments.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those of skill in the art can appreciate that different aspects of the embodiments can be practiced with other computer system configurations, including hand-held devices, multiprocessor systems, microprocessor-based or programmable consumer electronics, minicomputers, mainframe computers, and comparable computing devices. Aspects of the embodiments can also be practiced in distributed computing environments where tasks are performed by remote processing devices that are linked through a communications network. In a distributed computing environment, program modules can be located in both local and remote memory storage devices.

Aspects of the embodiments can be implemented as a computer-implemented process (method), a computing system, or as an article of manufacture, such as a computer program product or computer readable media. The computer program product can be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" can be a combination of software and hardware components for providing share permissions and organization of content in an application with multiple levels of organizational hierarchy. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, or processing device 600, as used herein, refers to a device comprising at least a memory and one or more processors that includes a server, a desktop computer, a laptop computer, a tablet computer, a smart phone, a vehicle mount computer, or a wearable computer. A memory can be a removable or non-removable component of a computing device configured to store one or more instructions to be executed by one or more processors. A processor can be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience can be embodied as a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) can be a set of routines, protocols, and tools for an application or service that allow the application or service to interact or communicate with one or more other applications and services managed by separate entities. According to aspects of the embodiments, audio test App 206 can be stored on RATD 202, HATD 204 and/or server 208. While some embodiments will be described in the general context of program modules that execute in conjunction with an application program that runs on an operating system on a personal computer, those skilled in the art will recognize that aspects may also be implemented in combination with other program modules.

Technical advantages exist for testing soundbars 112 utilizing the aspects of the embodiments that include programming and generating innumerable audio tests, recording their data, processing the same, and then comparing to specifications and/or previously recorded data. Additional technical advantages can include, but are not limited to, the ability to switch among different sources of audio signals and transmitting the same in a wired and/or wireless manner, and replicating real-word scenarios, such as when using a computer generated "far end" audio source to test AEC, beamforming, and the like.

FIGS. 1-7 illustrate various aspects of an audio test generating program or application (audio test App 206) to test soundbar 112, and which can be used on one or more computing devices, including, according to certain aspects of the embodiments, use of the internet or other similar networks. Audio test App 206 provides a practical, technical solution to the problem of integrating audio content from a multitude of sources and testing a soundbar 112 in a "real-world" environment; as those of skill in the art can appreciate, the aspects of the embodiments has no "analog equivalent" as its embodiments reside solely or substantially in the physical device or computer domain. That is, integrating diverse sources of audio content from a plurality of audio signal generators and using this to test a soundbar, always meant, and continues to mean, using practical, non-abstract physical devices. The technological improvement of the aspects of the embodiments resides in at least in the ability to quickly and easily integrate audio content from a plurality of content sources, but also in determining, using an algorithm, how the soundbar performs, which can only be accomplished through the user of computers and the like. In addition, such aspects of the embodiments have no "analog equivalents" because audio test App 206 not only generates the audio files, but also receives, records, stores and analyzes the audio test data generated by the soundbar DUT 222. This can only be done on a computer, and it allows a user to manipulate the generated audio signal and recorded audio data using many different types of commands none of which could be accomplished without a computer or some other technological equivalent.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The disclosed embodiments provide systems, methods, and modes for automated testing of a bi-directional audio communication system for use with teleconferencing systems. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for automated testing of a bi-directional audio communication system for use with teleconferencing systems

ALTERNATE EMBODIMENTS

Alternate embodiments may be devised without departing from the spirit or the scope of the different aspects of the embodiments.

What is claimed is:

1. A method for testing a bi-directional audio device under test (bi-directional audio DUT), the method comprising:

setting up the bi-directional audio DUT in a test room;

positioning one or more remote audio test devices (RATDs) within the test room, wherein each of the one or more RATDS is adapted to be— positioned at the same or different height as the bi-directional audio DUT, positioned at the same or different distance from the bi-directional audio DUT, and positioned at the same or different angular displacement with respect to the bi-directional audio DUT;

selecting an audio signal test track on a host audio test device (HATD), wherein the audio signal test track comprises one or more audio test signals;

transmitting the audio signal test track to the one or more RATDs from the host audio test device (HATD);

broadcasting the audio test signal by the RATD to the bi-directional audio DUT as an acoustic audio test signal; and receiving the acoustic audio test signal from at at least one mic on the bi-directional audio DUT;

converting the received acoustic audio test signal to audio signal test data;

transmitting the audio signal test data to the HATD; and calibrating one or more loudspeakers and one or more microphones that are part of one or more remote audio test devices (RATDs).

2. The method according to claim 1, wherein the step of calibrating comprises:

calibrating the one or more loudspeakers to a Teleconference level standard that comprises a specific sound pressure level corresponding to a typical human.

3. The method according to claim 1, wherein the step of calibrating comprises:

calibrating the one or more loudspeakers to a Teleconference level standard that comprises a specific frequency response corresponding to a typical human.

4. The method according to claim 1, wherein the step of transmitting comprises:

generating a uniquely addressed audio test signal for each of the one or more RATDs, and transmitting the same to the respective RATD.

5. The method according to claim 4, wherein the step of selecting an audio signal test track on a host audio test device (HATD) comprises:

selecting a first audio signal test track for a first group of RATDs, and selecting a second audio signal test track for a second group of RATDs.

6. The method according to claim 4, wherein the step of selecting an audio signal test track on a host audio test device (HATD) comprises:

selecting different audio signal test tracks for different respective RATDs, such that each RATD has its own unique audio signal test track.

7. The method according to claim 4, wherein the step of selecting an audio signal test track on a host audio test device (HATD) comprises:

defining different groups of RATDs, each group of RATDs comprising at least one RATD; and selecting different audio signal test tracks for each different group of RATDs, such that each group of RATDs has its own unique audio signal test track.

8. The method according to claim 1, wherein the step of selecting an audio signal test track comprises:

selecting an audio test signal that simulates a human voice.

9. The method according to claim 1, wherein the step of selecting an audio signal test track comprises:

selecting multiple audio test signals, each of which simulates a different human voice, with respective different frequency ranges and respective different amplitudes.

10. The method according to claim 1, wherein the step of selecting an audio signal test track comprises:

selecting an audio test signal that comprises background noise.

11. The method according to claim 1, wherein the step of selecting an audio signal test track comprises:

selecting multiple audio test signals, each of which comprises a different background noise.

12. The method according to claim 1, wherein the step of selecting an audio signal test track comprises:

selecting a first set of audio test signals, each of which comprises a first set of simulated human voices; and selecting one or more other audio test signals, each of which comprises different noise signals.

13. The conference room audio device test system according to claim 1, wherein the bi-directional audio DUT comprises a soundbar audio transceiver that includes at least one microphone, at least one loudspeaker, at least one processor and memory; and at least one transceiver device adapted to communicate with the HATD.

14. The conference room audio device test system according to claim 13, wherein the bi-directional audio DUT can be used in two or more remotely located conference rooms to perform teleconferencing between the remotely located conference rooms.

15. The conference room audio device test system according to claim 1, wherein each of the plurality of RATDs comprises:

at least one loudspeaker adapted to broadcast acoustic audio test signals to the at least one bi-directional DUT;

at least one microphone adapted to receive acoustic audio test signals from the at least one bi-directional DUT;

at least one processor and memory; and at least one transceiver device adapted to communicate with the HATD.

16. The conference room audio device test system according to claim 1, wherein the HATD is further adapted to store and process the received audio test data from the bi-directional audio transceiver DUT and generate audio test data reports.

17. A conference room audio device test system, comprising:

at least one bi-directional audio device under test (bi-directional audio DUT);

a plurality of remote audio test devices (RATDs) wherein each of the one or more RATDS is adapted to be— positioned at the same or different height as the bi-directional audio DUT, positioned at the same or different distance from the bi-directional audio DUT, and positioned at the same or different angular displacement with respect to the bi-directional audio DUT; and a host audio testing device (HATD), wherein the HATD is adapted to generate a plurality of uniquely addressed audio test signals, one for each of the plurality of RATDs, transmit the plurality of uniquely addressed audio test signals to respective RATDs, and receive audio test data from the at least one bi-directional audio DUT, and wherein each of the plurality of RATDs is further adapted to receive the respective uniquely addressed audio test signals, and broadcast the audio test signal to the bi-directional audio DUT as an acoustic audio test signal, and wherein the bi-directional audio DUT is further adapted to receive the acoustic audio test signal from at least one mic on the bi-directional audio DUT; and convert the received acoustic audio test signal to audio signal test data; and transmit the audio signal test data to the HATD.

18. The test system according to claim 17, wherein each of the one or more RATDs comprises:

one or more loudspeakers adapted to be calibrated; and one or more microphones adapted to be calibrated.

19. The test system according to claim 18, wherein the one or more loudspeakers are adapted to be calibrated to a Tele-conference level standard that comprises a specific sound pressure level corresponding to a typical human voice.

20. The test system according to claim 18, wherein the one or more loudspeakers to are adapted to be calibrated to a Tele-conference level standard that comprises a specific frequency response corresponding to a typical human voice.

21. The test system according to claim 17, wherein the HATD is further adapted to generate a uniquely addressed audio test signal for each of the one or more RATDs, and to transmit the same to the respective RATD.

22. The test system according to claim 21, wherein the HATD is further adapted to select a first audio signal test track for a first group of RATDs, and select a second audio signal test track for a second group of RATDs.

23. The test system according to claim 21, wherein the HATD is further adapted to select different audio signal test tracks for different respective RATDs, such that each RATD has its own unique audio signal test track.

24. The test system according to claim 21, wherein the HATD is further adapted to define different groups of RATDs, each group of RATDs comprising at least one RATD, and select different audio signal test tracks for each different group of RATDs, such that each group of RATDs has its own unique audio signal test track.

25. The test system according to claim 17, wherein the audio signal test track comprises:

an audio test signal that simulates a human voice.

26. The test system according to claim 17, wherein the audio signal test track comprises:

multiple audio test signals, each of which simulates a different human voice, with respective different frequency ranges and respective different amplitudes.

27. The test system according to claim 17, wherein the audio signal test track comprises:

an audio test signal that comprises background noise.

28. The test system according to claim 17, wherein the audio signal test track comprises:

multiple audio test signals, each of which comprises a different background noise.

29. The test system according to claim 17, wherein the audio signal test track comprises:

a first set of audio test signals, each of which comprises a first set of simulated human voices, and one or more other audio test signals, each of which comprises different noise signals.

30. The test system according to claim 17, wherein the bi-directional audio DUT comprises a soundbar audio transceiver that includes at least one microphone, at least one loudspeaker, at least one processor and memory; and at least one transceiver device adapted to communicate with the HATD.

31. The test system according to claim 30, wherein the bi-directional audio DUT can be used in two or more remotely located conference rooms to perform teleconferencing between the remotely located conference rooms.

32. The test system according to claim 17, wherein each of the plurality of RATDs comprises:

at least one loudspeaker adapted to broadcast acoustic audio test signals to the at least one bi-directional DUT;

at least one microphone adapted to receive acoustic audio test signals from the at least one bi-directional DUT;

at least one processor and memory; and at least one transceiver device adapted to communicate with the HATD.

33. The test system according to claim 17, wherein the HATD is further adapted to store and process the received audio test data from the bi-directional audio transceiver DUT and generate audio test data reports.

* * * * *